US010393440B2

(12) United States Patent
Sakuma

(10) Patent No.: US 10,393,440 B2
(45) Date of Patent: Aug. 27, 2019

(54) MOLTEN METAL TEMPERATURE CONTROL METHOD

(71) Applicant: TOYOTA JIDOSHA KABUSHIKI KAISHA, Toyota-shi, Aichi-ken (JP)

(72) Inventor: Daisuke Sakuma, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 159 days.

(21) Appl. No.: 15/290,539

(22) Filed: Oct. 11, 2016

(65) Prior Publication Data

US 2017/0102185 A1 Apr. 13, 2017

(30) Foreign Application Priority Data

Oct. 13, 2015 (JP) ................................ 2015-202284

(51) Int. Cl.
*F27D 21/00* (2006.01)
*F27D 11/06* (2006.01)
(Continued)

(52) U.S. Cl.
CPC ......... *F27D 21/0014* (2013.01); *B22D 2/006* (2013.01); *B22D 11/0611* (2013.01);
(Continued)

(58) Field of Classification Search
CPC ..... C22C 1/002; F27D 21/0014; F27D 11/06; F27D 21/02; F27D 2019/0003;
(Continued)

(56) References Cited

U.S. PATENT DOCUMENTS 5,183,493 A * 2/1993 Brandau .................... B01J 2/18 75/335
5,266,098 A * 11/1993 Chun ........................ B22F 9/08 75/335

FOREIGN PATENT DOCUMENTS

JP 01-153938 A 6/1989
JP 02-045730 A 2/1990
JP 2003-320442 A 11/2003

OTHER PUBLICATIONS

Rudnev, et al. "Industrial Applications of Industrial Heating." Handbook of Induction Heating, Second Edition 2017. pp. 9-50. First edition published 2002 (Year: 2002).*

* cited by examiner

*Primary Examiner* — Tima M. McGuthry-Banks
(74) *Attorney, Agent, or Firm* — Sughrue Mion, PLLC

(57) ABSTRACT

A molten metal temperature control method includes: with respect to relations among a spheroidization distance traveled by a molten metal of an alloy from a nozzle tip to a position where the molten metal turns into droplets, the temperature of the molten metal inside the crucible, and a pressure acting on the molten metal inside the crucible, obtaining a relation between the temperature and the spheroidization distance at a predetermined pressure, and setting a predetermined temperature range of the temperature; measuring a spheroidization distance when discharging the molten metal from the crucible at the predetermined pressure, and specifying a temperature corresponding to the measured spheroidization distance; and comparing the specified temperature and the predetermined temperature range, and when the specified temperature is outside the predetermined temperature range, controlling the specified temperature so as to be within the predetermined temperature range by adjusting the temperature inside the crucible.

13 Claims, 4 Drawing Sheets

(51) Int. Cl.

| | |
|---|---|
| ***F27D 21/02*** | (2006.01) |
| ***B22D 11/06*** | (2006.01) |
| ***C22C 1/00*** | (2006.01) |
| ***B22D 2/00*** | (2006.01) |
| *F27D 19/00* | (2006.01) |

(52) U.S. Cl.
CPC .............. *C22C 1/002* (2013.01); *F27D 11/06* (2013.01); *F27D 21/02* (2013.01); *F27D 2019/0003* (2013.01); *F27D 2019/0037* (2013.01); *F27D 2021/026* (2013.01)

(58) Field of Classification Search
CPC ............ F27D 2019/0037; B22D 2/006; B22D 11/0611; B22F 9/08; B22F 2009/0888
See application file for complete search history.

MOLTEN METAL TEMPERATURE CONTROL METHOD

CROSS REFERENCE TO RELATED APPLICATIONS

The disclosure of Japanese Patent Application No. 2015-202284 filed on Oct. 13, 2015 including the specification, drawings and abstract is incorporated herein by reference in its entirety.

BACKGROUND

1. Technical Field

The present disclosure relates to a method for controlling the temperature of a molten metal of an alloy.

2. Description of Related Art

A rare-earth magnet made of a rare-earth element, such as a lanthanoid, is also called a permanent magnet, and is used in the motors of hard disks and MRI apparatuses, as well as in the driving motors of hybrid electric vehicles, electric vehicles, etc.

Examples of rare-earth magnets include common sintered magnets of which the scale of crystal grains (main phase) constituting the structure is about 3 to 5 μm and nanocrystal magnets of which the crystal grains are refined to a nanoscale of about 50 nm to 300 nm. Among others, nanocrystal magnets in which the addition of expensive heavy rare-earth elements can be reduced (omitted) while the crystal grains can be refined are currently gaining attention.

To briefly explain a rare-earth magnet manufacturing method: for example, a molten metal of an alloy (e.g., Nd—Fe—B-based molten metal) that is a material for a rare-earth magnet is prepared inside a crucible having a nozzle at the bottom, and the molten metal is discharged downward from the nozzle and fed onto a melt-quenching rotating roll. The molten metal of the alloy having been fed onto the rotating roll is rapidly solidified by the rotating roll and turns into a quenched ribbon (quenched thin strip), and is jetted in a direction tangential to a point in the rotating roll to which the molten metal has been dripped. The quenched ribbon is ground into a desired size to obtain powder for a magnet, and this powder is sintered while being pressure-formed to manufacture a sintered body.

One of the factors determining the quality of a quenched ribbon is the viscosity of the molten metal before a quenched ribbon is produced from the molten metal. The viscosity of the molten metal varies with the temperature of the molten metal.

Accordingly, one can conceive of measuring the viscosity and the temperature of a molten metal of an alloy and controlling the quality of a quenched ribbon to be produced on the basis of the measurement results. However, it is difficult to directly measure the viscosity and the temperature of a high-temperature molten metal of an alloy.

Here, Japanese Patent Application Publication No. 2003-320442 discloses a quenched alloy manufacturing method in which a molten metal of an alloy is brought into contact with a rotating cooling roll to thereby quench the alloy and obtain an alloy containing a crystal phase. More specifically, JP 2003-320442 A discloses a quenched alloy manufacturing method including the steps of: preparing a molten metal of an alloy by heating an alloy; feeding the molten metal of the alloy onto the cooling roll; measuring the alloy temperature by detecting infrared light radiated by the alloy in motion in the solidification process of the molten metal of the alloy; and adjusting the quenching conditions on the basis of the alloy temperature.

Japanese Patent Application Publication No. 1-153938 and Japanese Patent Application Publication No. 2-45730 disclose slurry viscosity on-line measurement devices. Specifically, the devices are configured to measure the length of a continuous part of slurry released from a nozzle and a pressure under which the slurry is jetted out of the nozzle, and estimate the viscosity of the slurry from relations among the nozzle diameter, the length of the continuous part of the slurry, and the jet pressure of the slurry that are obtained in advance.

In the quenched alloy manufacturing method disclosed in JP 2003-320442 A, the alloy temperature is measured by detecting the infrared light radiated from the alloy in motion. However, the method of detecting the infrared light radiated from the alloy with an infrared thermometer may lead to a significant error between the actual alloy temperature and the measured temperature.

On the other hand, the viscosity measurement devices disclosed in JP 1-153938 A and JP 2-45730 A are claimed to be capable of measuring the viscosity of slurry with high accuracy and repeatability in any atmosphere, without being influenced by the temperature and the humidity of the atmosphere. However, this technique takes no account of the relation between the viscosity and the temperature of the slurry, and is confined to high-accuracy measurement of viscosity. That is, a temperature of the molten metal that is difficult to directly measure cannot be accurately specified by this technique.

In view of the close relation between the viscosity and the temperature of a molten metal of an alloy and the difficulty of directly measuring the viscosity and the temperature of a molten metal, the present inventors have devised a technique that can control the viscosity of a molten metal indirectly and accurately by specifying the melt temperature from another parameter and controlling the specified molten metal temperature so as to be within a proper temperature range, and can thereby manufacture quenched ribbons of excellent quality.

SUMMARY OF THE DISCLOSURE

The present disclosure provides a molten metal temperature control method that can accurately specify the temperature of a molten metal of an alloy and thereby contribute to manufacturing quenched ribbons of excellent quality.

A molten metal temperature control method in one aspect of the present disclosure includes: a first step of, with respect to relations among a spheroidization distance traveled by a molten metal of an alloy discharged from a nozzle, with a predetermined diameter, of a crucible from a nozzle tip to a position where the molten metal turns into droplets, the temperature of the molten metal inside the crucible, and a pressure acting on the molten metal inside the crucible, obtaining in advance a relation between the temperature and the spheroidization distance at a predetermined pressure that is the pressure acting on the molten metal inside the crucible, and setting a predetermined temperature range of the temperature; a second step of measuring the spheroidization distance when discharging the molten metal from the crucible at the predetermined pressure, and specifying the temperature corresponding to the measured spheroidization distance; and a third step of comparing the specified temperature and the predetermined temperature range, and when the specified temperature is outside the predetermined temperature range, controlling the specified temperature so as to be within the predetermined temperature range by adjusting the temperature inside the crucible.

Based on the facts that the spheroidization distance traveled by the molten metal of the alloy discharged from the nozzle of the crucible from the nozzle tip to the position where the molten metal turns into droplets is related with the viscosity of the molten metal, and that the viscosity of the molten metal is related with the temperature of the molten metal, the molten metal temperature control method in one aspect of the present disclosure accurately specifies the temperature of the molten metal by measuring the spheroidization distance.

Another conceivable method is to dispose a thermometer, such as a thermocouple, in a small hole provided at the position of the nozzle in the crucible and directly measure the temperature of the molten metal. However, if a thermometer is installed in a small hole provided at the position of the nozzle, when the pressure of an Ar gas etc. is applied to the molten metal inside the crucible to discharge the molten metal from the nozzle, the gas may leak through the small hole, making it difficult to maintain a constant gas pressure. This is why the temperature of the molten metal inside the crucible cannot be directly measured, and therefore the present disclosure specifies the temperature of the molten metal from the spheroidization distance.

Here, the "spheroidization distance" may be a distance traveled by the molten metal before droplets are formed based on the Plateau-Rayleigh instability theory that explains the reasons why a stream of water turns into droplets. This theory explains, for example, that a columnar stream of vertically falling water turns into droplets when the length of the column becomes $\pi$ times the diameter of the column; that the droplets thus formed have a smaller surface area than the original column; and that the column turns into droplets on the basis of the periodically changing thickness of the column and the nozzle shape.

The spheroidization of a molten metal depends on the viscosity of the molten metal, and the spheroidization distance traveled by the molten metal to a place where the molten metal spheroidizes due to surface tension varies with the temperature of the molten metal.

Here, since the spheroidization distance varies with the pressure acting on the molten metal inside the crucible, a temperature-versus-spheroidization distance correlation (graph) is set for each pressure.

Moreover, since the temperature-versus-spheroidization distance correlation graph varies with the nozzle diameter of the crucible, a temperature-versus-spheroidization distance correlation graph according to the nozzle diameter of the crucible is set.

Various molten metal temperatures inside the crucible (and the spheroidization distances corresponding to the respective molten metal temperatures) and the quality of a quenched ribbon produced from the molten metal at the respective temperatures are examined in advance, and an optimal molten metal temperature range within which a quenched ribbon of desired quality is produced is set.

Here, the quenched ribbon of desired quality means a quenched ribbon within a desired range of the crystal grain size of not larger than 200 nm, for example, in the case of a quenched ribbon for a nanocrystal magnet. The meaning of the quenched ribbon of desired quality also includes a quenched ribbon of a composition to be created, for example, in the case where a quenched ribbon of a crystal composition is to be created or where a quenched ribbon of an amorphous composition is to be created.

The molten metal temperature corresponding to the spheroidization distance is specified from the measured spheroidization distance, and if the specified temperature is within the predetermined molten metal temperature range that is preset, the molten metal temperature inside the crucible is maintained, while when the specified temperature is outside the predetermined temperature range, the temperature is adjusted so as to be within the predetermined temperature range by heating or cooling the inside of the crucible.

For example, when the molten metal is at a temperature above an upper limit of the predetermined temperature range, the molten metal is slow to cool and coarse-grained crystals are likely to be formed. Conversely, when the molten metal is at a temperature below a lower limit of the predetermined temperature range, the viscosity of the molten metal is so high that the molten metal is likely to become a comparatively large mass. As a result, the inside of the mass is slow to cool and coarse-grained crystals are likely to be formed. For these reasons, the upper and lower limits below and above which coarse grains are not formed or hardly formed are defined, and the range between these limits can be set as the predetermined temperature range.

The molten metal temperature control method in one aspect of the present disclosure can, without measuring the viscosity and the temperature of a molten metal that are difficult to directly measure, accurately specify the temperature of the molten metal by measuring the easy-to-measure spheroidization distance, i.e., accurately control the temperature of the molten metal and the viscosity corresponding to the temperature by an indirect parameter, and can thereby contribute to producing quenched ribbons of excellent quality.

The molten metal may be an alloy used for forming a quenched ribbon that is a material for a rare-earth magnet.

The quenched ribbon may include an RE-Fe—B-based main phase, where RE is at least one of Nd and Pr, and a grain boundary phase of an RE-X alloy, where X is a metal element containing no heavy rare-earth element, present around the main phase.

The RE-X alloy constituting the grain boundary phase may be any one type of Nd—Co, Nd—Fe, Nd—Ga, Nd—Co—Fe, and Nd—Co—Fe—Ga, or is a mixture of at least two of Nd—Co, Nd—Fe, Nd—Ga, Nd—Co—Fe, and Nd—Co—Fe—Ga.

As can be understood from the above description, according to the molten metal temperature control method in one aspect of the present disclosure, it is possible to accurately specify the temperature of a molten metal from the correlation between the spheroidization distance and the molten metal temperature by measuring the spheroidization distance traveled by the molten metal of the alloy discharged from the nozzle of the crucible from the nozzle tip to the position where the molten metal turns into droplets. Controlling the molten metal temperature thus specified so as to be within a predetermined molten metal temperature range that is preset leads to the production of quenched ribbons of desired quality.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

In the following, an embodiment of a molten metal temperature control method of the present disclosure will be described with reference to the drawings.

(Embodiment of Molten Metal Temperature Control Method)

Figure 1:
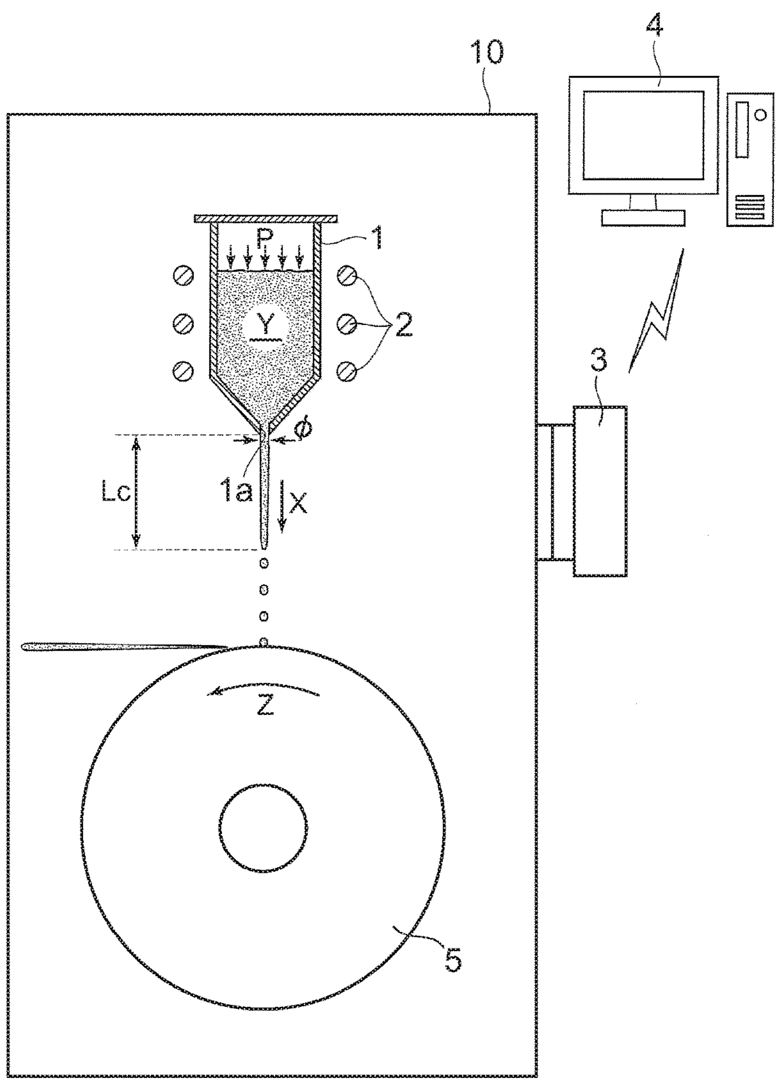
FIG. 1 is a schematic view illustrating a molten metal temperature control method according to one aspect of the present disclosure.
Figure 2:
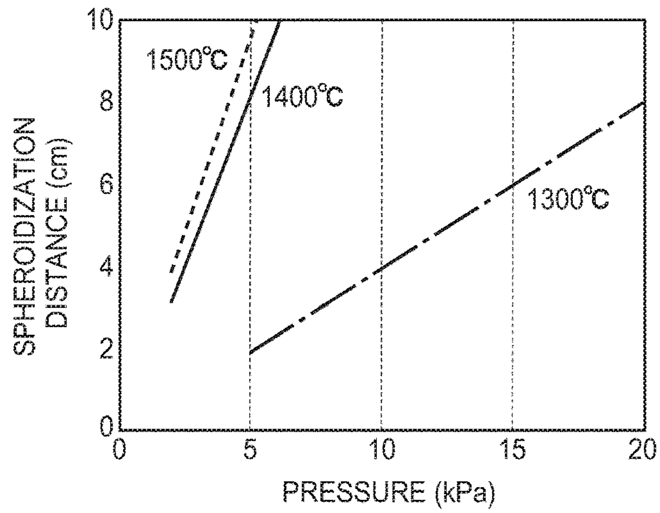
FIG. 2 is a view showing a pressure-versus-spheroidization distance correlation graph.
Figure 3:
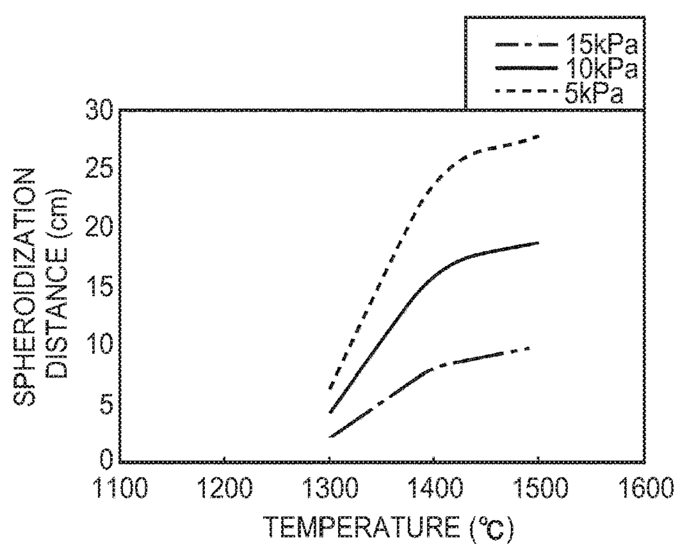
FIG. 3 is a view showing a temperature-versus-spheroidization distance correlation graph.
Figure 4:
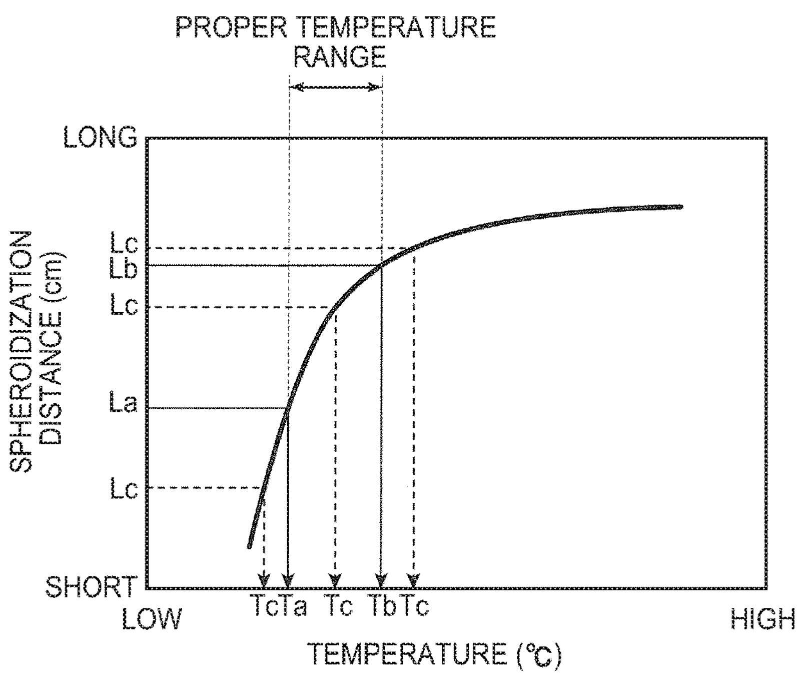
FIG. 4 is a view illustrating the molten metal temperature control method based on the temperature-versus-spheroidization distance correlation graph.
Figure 5:
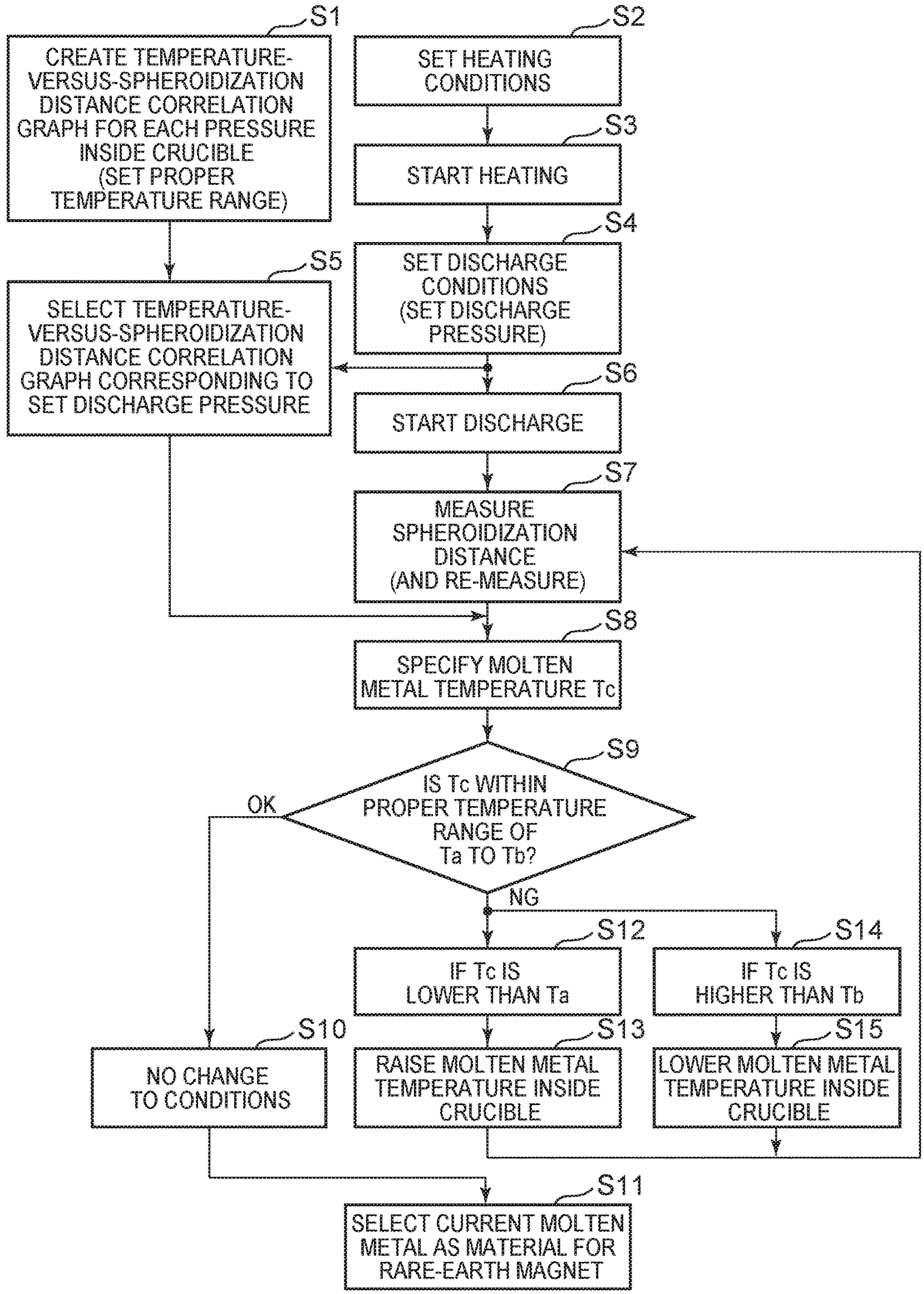
FIG. 5 is a flowchart illustrating the molten metal temperature control method according to one aspect of the present disclosure.

FIG. 1 is a schematic view illustrating the molten metal temperature control method of the present disclosure; FIG. 2 is a view showing a pressure-versus-spheroidization distance correlation graph; FIG. 3 is a view showing a temperature-versus-spheroidization distance correlation graph; and FIG. 4 is a view illustrating the molten metal temperature control method based on the temperature-versus-spheroidization distance correlation graph. FIG. 5 is a flowchart illustrating the molten metal temperature control method of the present disclosure.

As shown in FIG. 1, a crucible 1 having a nozzle 1*a* with a predetermined diameter ϕ provided at the bottom, a high-frequency coil 2 disposed around the crucible 1, and a rotating roll 5 that is disposed under the nozzle 1*a* and quenches droplets of a molten metal falling thereon are disposed inside a chamber 10, and a quenched ribbon that is a material for a rare-earth magnet is manufactured inside the chamber 10 by the melt spinning method.

As the high-frequency coil 2 is activated, an alloy used for forming a quenched ribbon that is a material for a rare-earth magnet is melted by high-frequency induction heating and the molten metal Y is generated inside the crucible 1. The inside of the chamber 10 is kept at a reduced pressure not higher than 50 Pa, for example, while the inside of the crucible 1 is placed in an Ar—gas atmosphere. The molten metal Y is pressed with an Ar gas at a pressure P not higher than 100 kPa, for example, to discharge the molten metal Y downward (in the X-direction) through the nozzle 1*a*.

The molten metal Y having been discharged downward from the nozzle 1*a* first stretches in the form of a stream over a predetermined spheroidization distance Lc, and turns into droplets down beyond the spheroidization distance Lc. These droplets fall on the top of the copper rotating roll 5 that is rotating (in the Z-direction), where the droplets are quenched and a quenched ribbon resulting from quenching is jetted in a direction tangential to the top of the rotating roll 5. The spheroidization distance Lc refers to a distance traveled by the molten metal before droplets, based on the Plateau-Rayleigh instability theory, are formed.

Here, the quenched ribbon is composed of an RE-Fe—B-based main phase (RE: at least one of Nd and Pr) and an RE-X alloy (X: a metal element containing no heavy rare-earth element) present around the main phase, and in the case of a nanocrystal structure, for example, the quenched ribbon is composed of a main phase of crystal grains not larger than 200 nm.

The Nd—X alloy constituting the grain boundary phase is an alloy composed of Nd and at least one of Co, Fe, Ga, Cu, Al, etc., and, for example, composed of any one kind of Nd—Co, Nd—Fe, Nd—Ga, Nd—Co—Fe, and Nd—Co—Fe—Ga, or is a mixture of at least two of Nd—Co, Nd—Fe, Nd—Ga, Nd—Co—Fe, and Nd—Co—Fe—Ga.

Although not shown, a flow passage is disposed inside the chamber 10 in a direction in which the quenched ribbon is jetted, and the jetted quenched ribbon passes through the flow passage and is collected in a collection box.

To measure the spheroidization distance Lc of the molten metal Y under the crucible 1, an imaging device 3, such as a charge-coupled device (CCD) camera, is disposed at a position obliquely under the crucible 1, and image data is transmitted to a computer 4 by wired or wireless transmission.

Here, the present inventors have found that there is a linear correlation between the spheroidization distance Lc and a pressure acting on the molten metal Y inside the crucible 1 (pressure P in FIG. 1). FIG. 2 shows the pressure-versus-spheroidization distance correlation graph in three cases where the temperature of the molten metal Y is respectively 1300° C., 1400° C., and 1500° C. and the nozzle diameter is the predetermined diameter ϕ. On the creation of the graph, the pressure-versus-spheroidization distance correlation graph at each temperature is obtained on the following conditions: the vacuum degree inside the chamber 10 is not higher than 50 Pa; the Ar-gas pressure inside the crucible 1 is within the range of 0 to 100 kPa; the nozzle diameter is 0.6 to 1.0 mm; and the alloy weight is 4 kg.

FIG. 3 shows the temperature-versus-spheroidization distance correlation graph created on the basis of FIG. 2. From the temperature-versus-spheroidization distance correlation graph shown in FIG. 3 specified by the present inventors, it can be seen that the spheroidization distance increases with the increasing temperature, and that the correlation graph is a curved graph that reaches an inflection point at around 1400° C.

It can also be seen that the spheroidization distance increases as the pressure acting on the molten metal Y inside the crucible 1 decreases.

FIG. 4 is a view schematically showing the temperature-versus-spheroidization distance correlation graph of FIG. 3, and illustrating the molten metal temperature control method of the present disclosure.

The molten metal temperature control method of the present disclosure involves measuring the spheroidization distance of the molten metal instead of the temperature and the viscosity of the molten metal that are difficult to directly measure, plotting the measured spheroidization distance on the temperature-versus-spheroidization distance correlation graph shown in FIG. 4, specifying the temperature corresponding to that spheroidization distance, and controlling the specified temperature so as to be within a preset proper temperature range (predetermined temperature range).

The molten metal temperature control method further involves examining in advance various temperatures of the molten metal Y inside the crucible 1 (and the spheroidization distances Lc corresponding to the respective temperatures of the molten metal Y) and the quality of a quenched ribbon produced from the molten metal Y at the respective temperatures, and setting, as the proper temperature range, an optimal temperature range of the molten metal Y within which a quenched ribbon of desired quality is produced.

In FIG. 4, the lower limit and the upper limit of the proper temperature range of the molten metal Y are Ta° C. and Tb°

C., respectively, and the spheroidization distances corresponding to the temperatures Ta and Tb are La cm and Lb cm, respectively.

If a temperature Tc corresponding to the measured spheroidization distance Lc is within the proper temperature range of Ta to Tb, it is regarded that a quenched ribbon of desired quality can be produced, and control is performed so as to maintain the temperature of the molten metal Y inside the crucible 1 as it is.

On the other hand, if the temperature Tc corresponding to the measured spheroidization distance Lc is below the lower limit Ta° C., control is executed so as to raise the temperature of the molten metal Y inside the crucible 1 by further heating the crucible 1 with the high-frequency coil 2, and control is executed such that the temperature Tc corresponding to the measured spheroidization distance Lc falls within the proper temperature range of Ta to Tb.

Conversely, if the temperature Tc corresponding to the measured spheroidization distance Lc is above the upper limit Tb° C., control is executed so as to lower the temperature of the molten metal Y inside the crucible 1 by stopping the heating of the crucible 1 with the high-frequency coil 2, or cooling the crucible 1 in addition to stopping the heating, and control is executed such that the temperature Tc corresponding to the measured spheroidization distance Lc falls within the proper temperature range of Ta to Tb.

Inside the computer 4 shown in FIG. 1, the temperature-versus-spheroidization distance correlation graphs corresponding to various pressures are stored. Data on the spheroidization distance Lc imaged by the imaging device 3 is transmitted to the computer 4, and the spheroidization distance Lc is plotted on the temperature-versus-spheroidization distance correlation graph inside the computer 4.

Then, the temperature Tc corresponding to that spheroidization distance Lc is specified, and it is determined whether or not the specified temperature Tc is within the proper temperature range of Ta to Tb.

Here, the molten metal temperature control method of the present disclosure will be described with reference to the flowchart of FIG. 5.

First, a temperature-versus-spheroidization distance correlation graph is created for each of various pressures that can be set inside the crucible 1 having the nozzle with the predetermined diameter ϕ, and a proper temperature range of the molten metal Y is set in each correlation graph (step S1) (the end of a first step of the molten metal temperature control method). Since the temperature-versus-spheroidization distance correlation graph varies with different nozzle diameters ϕ, if there are a plurality of crucibles 1 with different nozzle diameters, the temperature-versus-spheroidization distance correlation graphs for the respective pressures are created for each crucible 1.

Next, the heating conditions of the molten metal Y inside the crucible 1 are set (step S2). In this step of setting the heating conditions, it is preferable that the heating conditions are set such that the temperature of the molten metal Y discharged from the nozzle 1*a* falls within the set proper temperature range of Ta to Tb. However, the initial heating conditions do not have to be set exactly. This is because, as will be described later, if the specified temperature of the molten metal Y is not within the proper temperature range of Ta to Tb, measures are taken to bring the specified temperature into the proper temperature range of Ta to Tb by executing the control of raising or lowering the temperature of the molten metal Y inside the crucible 1.

When the heating conditions have been set, the heating of the crucible 1 and the molten metal Y inside the crucible 1 with the high-frequency coil 2 is started (step S3).

Prior to the start of heating, or after the start of heating, the inside of the chamber 10 is depressurized and the inside of the crucible 1 is placed in an Ar-gas atmosphere, and the pressure of the Ar gas, i.e., the pressure P acting on the molten metal Y (discharge pressure) is set (step S4). Then, the discharge of the molten metal Y from the nozzle 1*a* is started (step S6).

A temperature-versus-spheroidization distance correlation graph corresponding to the set discharge pressure is selected (step S5), and the molten metal temperature is controlled on the basis of the selected temperature-versus-spheroidization distance correlation graph.

After the discharge of the molten metal Y is started, the spheroidization distance Lc of the molten metal Y is measured (step S7). The measured spheroidization distance Lc is transmitted to the computer 4, and the spheroidization distance Lc is plotted on the temperature-versus-spheroidization distance correlation graph already selected inside the computer 4, and the molten metal temperature Tc corresponding to the spheroidization distance Lc is specified (step S8) (the end of a second step of the molten metal temperature control method).

It is examined inside the computer 4 whether or not the specified molten metal temperature Tc is within the proper temperature range of Ta to Tb (step S9).

Although not shown, a determination unit, a central processing unit (CPU) comprising a microprocessor or the like, a RAM, a ROM, a correlation graph storage unit, etc. are connected with one another through buses inside the computer 4, and the determination unit determines whether or not the molten metal temperature Tc is within the proper temperature range of Ta to Tb.

If the molten metal temperature Tc is within the proper temperature range of Ta to Tb, no change is made to the conditions, such as the heating conditions and the pressure condition of the Ar gas (step S10), and the discharge of the molten metal Y onto the rotating roll 5 is continued with the current temperature of the molten metal Y maintained. Then, a quenched ribbon formed by the molten metal Y being quenched on the surface of the rotating roll 5 is selected as the material for the rare-earth magnet (step S11).

On the other hand, if the molten metal temperature Tc is lower than the lower limit Ta of the proper temperature range of Ta to Tb (step S12), the molten metal temperature inside the crucible 1 is raised with the high-frequency coil 2 (step S13), and the molten metal Y is discharged to re-measure the spheroidization distance Lc (step S7).

The above steps are repeated until the molten metal temperature Tc corresponding to the re-measured spheroidization distance Lc falls within the proper temperature range of Ta to Tb, and at a point when the temperature of the molten metal Y falls within the proper temperature range of Ta to Tb, the temperature of the molten metal Y is maintained and the discharge of the molten metal Y onto the rotating roll 5 is continued.

If the molten metal temperature Tc is higher than the upper limit Tb of the proper temperature range of Ta to Tb (step S14), heating with the high-frequency coil 2 is stopped to lower the molten metal temperature inside the crucible 1 (step S15), and the molten metal Y is discharged to re-measure the spheroidization distance Lc (step S7).

In this case, too, the above steps are repeated until the molten metal temperature Tc corresponding to the re-measured spheroidization distance Lc falls within the proper temperature range of Ta to Tb, and at a point when the temperature of the molten metal Y falls within the proper temperature range of Ta to Tb, the temperature of the molten metal Y is maintained and the discharge of the molten metal Y onto the rotating roll 5 is continued (the end of a third step of the molten metal temperature control method).

According to the shown molten metal temperature control method, it is possible to accurately specify the temperature of the molten metal that is difficult to directly measure, and obtain a quenched ribbon of desired quality by controlling the specified temperature so as to be within the proper temperature range.

While the embodiment of the present disclosure has been described in detail using the drawings, the specific configuration is not limited to that of the embodiment, and any design changes etc. made within the scope of the present disclosure shall be included in the disclosure.

The invention claimed is:

1. A molten metal temperature control method comprising:

(1) with respect to relations among (a) a spheroidization distance traveled by a molten metal of an alloy discharged from a nozzle of a crucible, with a predetermined nozzle diameter, from a nozzle tip to a position where the molten metal turns into droplets, (b) a temperature of the molten metal inside the crucible, and (c) a pressure acting on the molten metal inside the crucible, obtaining in advance a relation between the temperature of the molten metal inside the crucible and the spheroidization distance at a predetermined pressure that is the pressure acting on the molten metal inside the crucible, and setting a predetermined temperature range of the temperature of the molten metal inside the crucible;

(2) measuring the spheroidization distance when discharging the molten metal from the crucible at the predetermined pressure, and specifying a temperature corresponding to the measured spheroidization distance; and (3) comparing the specified temperature and the predetermined temperature range, and controlling the specified temperature so as to be within the predetermined temperature range by adjusting the temperature of the molten metal inside the crucible.

2. The molten metal temperature control method according to claim 1, wherein the spheroidization distance is a distance traveled by the molten metal before droplets based on the Plateau-Rayleigh instability theory are formed.

3. The molten metal temperature control method according to claim 1, wherein the molten metal is an alloy used for forming a quenched ribbon that is a material for a rare-earth magnet.

4. The molten metal temperature control method according to claim 3, wherein the quenched ribbon includes an RE-Fe—B-based main phase, where RE is at least one of Nd and Pr, and a grain boundary phase of an RE-X alloy, where X is a metal element containing no heavy rare-earth element, present around the main phase.

5. The molten metal temperature control method according to claim 4, wherein the RE-X alloy constituting the grain boundary phase is any one type of Nd—Co, Nd—Fe, Nd—Ga, Nd—Co—Fe, and Nd—Co—Fe—Ga, is or a mixture of at least two of Nd—Co, Nd—Fe, Nd—Ga, Nd—Co—Fe, and Nd—Co—Fe—Ga.

6. The molten metal temperature control method according to claim 1, wherein the spheroidization distance is measured by an imaging device.

7. The molten metal temperature control method according to claim 6, wherein the imaging device is a charge-coupled device (CCD) camera.

8. The molten metal temperature control method according to claim 1, wherein the adjusting the temperature inside the crucible comprises controlling a high-frequency coil that heats the molten metal in the crucible by induction heating.

9. The molten metal temperature control method according to claim 8, wherein, when the specified temperature is above an upper limit of the predetermined temperature range, the heating with the high-frequency coil is stopped to lower the temperature of the molten metal inside the crucible.

10. The molten metal temperature control method according to claim 9, wherein, after the heating with the high-frequency coil is stopped, the molten metal is discharged to re-measure the spheroidization distance.

11. The molten metal temperature control method according to claim 8, wherein, when the specified temperature is below an upper limit of the predetermined temperature range, the temperature of the molten metal inside the crucible is raised with the high-frequency coil.

12. The molten metal temperature control method according to claim 11, wherein, after the temperature of the molten metal inside the crucible is raised with the high-frequency coil, the molten metal is discharged to re-measure the spheroidization distance.

13. The molten metal temperature control method according to claim 1, wherein a determination unit compares the specified temperature and the predetermined temperature range and determines whether the molten metal temperature is within the predetermined temperature range.

* * * * *